United States Patent Office 3,435,714
Patented Apr. 1, 1969

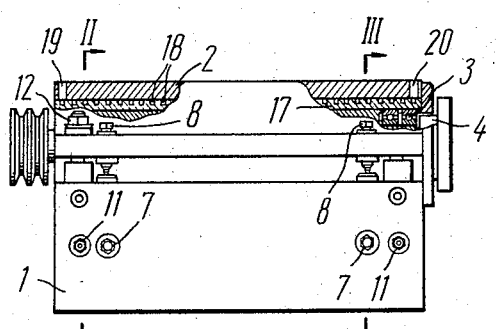
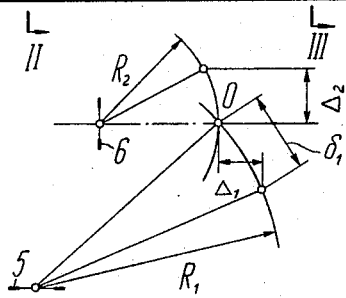
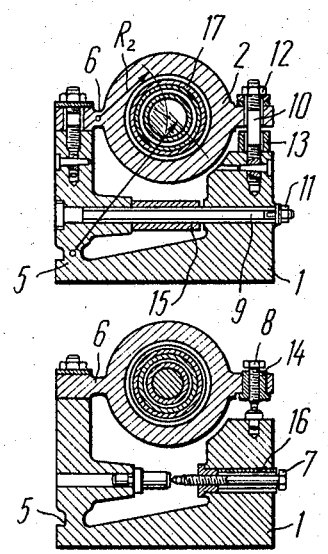
FIG. 1
FIG. 2
FIG. 7
FIG. 3

3,435,714
SPINDLE HEAD OF MACHINE
Boris Moiseevich Bromberg, ulitsa Akademika Pavlova, 27, kv. 23, Moisei Yakovlevich Gauzner, ulitsa Gogolya, 5, kv. 19, Ilya Samuilovich Ljutsin, ulitsa Komsomolskaya, 43, kv. 41, and Moisei Simonovich Nadel, ulitsa Kirova, 95, kv. 8, all of Odessa, U.S.S.R.
Filed Feb. 28, 1967, Ser. No. 619,283
Int. Cl. B23b *39/00, 19/02;* B23c *7/00*
U.S. Cl. 77—3
8 Claims

ABSTRACT OF THE DISCLOSURE

A diamond drill head or the like having fine adjustment for precise location of the axis of the drill spindle after the spindle has been preliminarily positioned, in which the spindle bearing is mounted on a support having limited flexibility along at least two lines. Flexing the support along one of these lines permits adjustment of the spindle along a small arc in one direction, and flexing the support along the other line permits adjustment of the spindle in a small arc in a direction at right angles to said first direction. The means to flex the support preferably also prestresses the lines of limited flexibility. Structure is also provided for adequate cooling to avoid misalignment of the spindle caused by heat developed in use.

---

The invention relates to spindle heads of machines and, more particularly, of diamond-tool boring machines.

Spindle heads of machines, including diamond-tool boring machines are known, in which the spindle rotates on bearings enclosed by the spindle head body. To achieve the adjustment of the spindle axis vertically and horizontally in space, said spindle heads are made displaceable along respective supporting surfaces.

The disadvantage of the known spindle heads is that adjustment of the spindle axis position in space is time consuming, while fine adjustment to ensure a particularly high degree of accuracy is impossible. This may be explained by the fact that in the known spindle heads adjustment involves fitting. Moreover, the fixing or securing of the spindle head after adjustment results in disturbing the adjusted position of the spindle axis, because in such cases the yielding of a joint will destroy the required accuracy of adjustment.

An object of the present invention is to provide a spindle head of a machine which permits a particularly high accuracy to be obtained when adjusting the spindle axis position in space.

Another object of the invention is to provide a spindle head of a machine in which the adjustment of the spindle axis position in space can be done without fitting.

The invention consists essentially in that the spindle head body has areas or lines of reduced bending strength to facilitate the deformation of said body in at least two planes, performed by a means for fine adjustment of the spindle axis position in space.

It is expedient to make the areas or lines of reduced bending strength by providing portions of less thickness.

The areas of reduced bending strength can have at least one hole each.

The areas of reduced bending strength can have at least one groove each.

It is expedient to make the means for fine adjustment of the spindle axis as screws disposed in the walls of the spindle support to put bending stress on the lines of flexure of the spindle support.

Further objects and advantages of this invention will become apparent upon considering an exemplary embodiment thereof and accompanying drawings, wherein:

FIG. 1 shows a spindle head, according to the invention, the body of which has areas of reduced bending strength made for providing a thin portion to introduce the possibility of flexure of the head;

FIG. 2 is a section taken on line II—II of FIG. 1;

FIG. 3 is a section taken on line III—III of FIG. 1;

FIG. 7 is a diagram of the spindle axis displacement, according to the invention.

Figure 5:
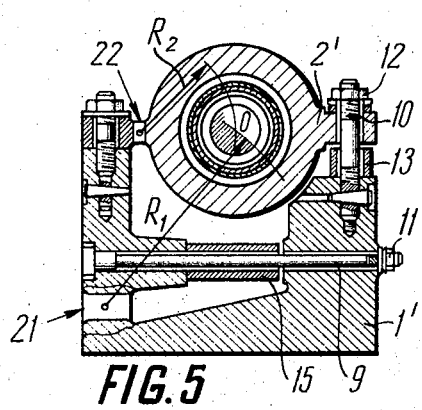
FIG. 5 is a section taken on line V—V of FIG. 4.

The spindle head of the present invention is shown as used in diamond-tool boring machines.

The spindle head body consists of two elements, namely, a base 1 (FIGS. 1 and 2) and a bracket 2. Mounted inside the bracket 2 are bearings 3 of a spindle 4.

In the body walls there are areas 5 and 6 of reduced bending strength made in the form of reduced wall thickness. A means for fine adjustment of the position of the spindle 4 axis in space is provided consisting of screws 7, 8 and 9 (FIGS. 2 and 3), pins 10, nuts 11 and 12, and bushes 13, 14, 15 and 16.

To provide for the removal of heat from the spindle bearings, a cylindrical sleeve 17 (FIG. 1) is pressed in the bracket 2, the bearings 3 being mounted inside said sleeve. A spiral groove 18 is provided in the external surface of the sleeve 17 to effect the forced feed of the coolant. The bracket 2 has holes 19 and 20 to feed and drain the coolant.

Figure 4:
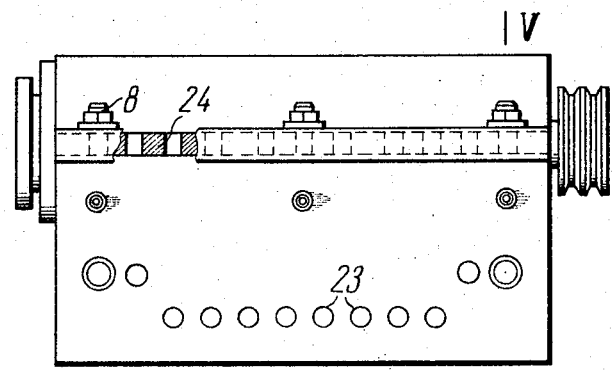
FIG. 4 shows the spindle head, according to the invention, in which the areas of reduced bending strength of its body are provided with holes.

FIGS. 4 and 5 show another modification of the base 1' and bracket 2' of the spindle head, in which areas 21 and 22 of reduced bending strength have holes 23 and 24.

Figure 6:
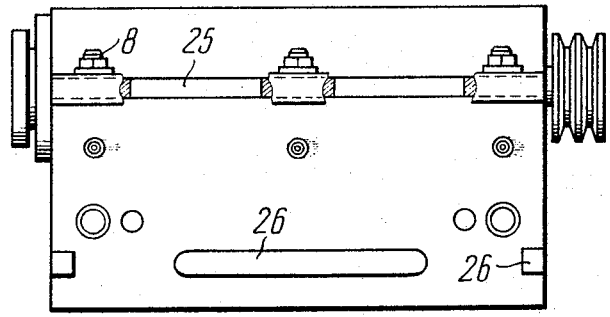
FIG. 6 shows the spindle head, according to the invention, in which the areas of reduced bending strength of its body are provided with grooves.

The spindle head body can also have areas or lines of reduced bending strength, said areas being provided by grooves 25 and 26 (FIG. 6).

Preliminary adjustment of the spindle axis position in space is performed by displacing the whole body, as is done in using the known spindle heads. Final, fine, adjustment is performed by deforming or bending the body along the lines of reduced bending strength so that the body elements swing relative to centers located in the areas 5 and 6 of reduced bending strength.

First, the base 1 is deformed with the aid of the nuts 11 (FIG. 2) and the screws 7 (FIG. 3), thus effecting horizontal adjustment of the position of spindle axis O (FIG. 7). The spindle axis is displaced along an arc of radius $R_1$, by value $b_1$ corresponding to horizontal displacement $\Delta_1$. After that, the bracket 2 is deformed with the aid of the nuts 12 (FIG. 2) and the screws 8 (FIG. 3), thus swinging the axis O (FIG. 7) on an arc radius $R_2$ until the latter takes its proper vertical position. Vertical displacement $\Delta_2$ corresponds to this adjustment.

The bushes 13 and 15 (FIG. 2), as well as 14 and 16 (FIG. 3), prevent the possibility of deformations which are beyond the body strength.

The means for fine adjustment of the axis position in space makes it possible to displace the spindle axis parallel to itself and turn it in space. The rigidity of the spindle head required for a vibration-free operation is insured by prestressing the areas of reduced bending strength with the aid of the same means.

Coolant is forced towards the hole 19 (FIG. 1) of the bracket 2, then, while passing through the spiral groove 18, it absorbs heat evolved by the spindle bearings 3, cools the latter as well as the sleeve 17 and the bracket 2, and is then discharged from the latter through the hole 20.

Stable temperature conditions in the spindle head are achieved by automatically or manually adjusting the flow rate of temperature of the coolant fed into the device.

The possibility of fine adjustment of the spindle axis position in space by deforming the spindle head body in two planes, and not by displacing the whole spindle head, permits considerable improvement in the accuracy of adjustment and reduces the labor required for the operation of adjusting the spindle due to the exclusion of the need for fitting as well as of the detachment of the spindle head prior to adjustment and fixing it again after adjustment is accomplished. This invention also allows for periodical fine adjustment of the spindle axis position as required by measurements of machined parts.

The possibility of providing spiral grooves for the flow of coolant in close proximity to the bearings, reliable continuous circulation of coolant, a considerable heat transfer area without serious reduction of the strength and rigidity of the sleeve, as well as a sufficient line of contact between the mating surfaces of the sleeve and the body, insure the effective removal of heat from the spindle bearings, minimizing the heating of the sleeve together with the body and temperature difference at various points of these parts, at a sufficient total rigidity of the unit. As a result, thermal deformations caused by the heat evolved by the spindle bearings are minimized, and the finally adjusted position of the spindle axis in space remains undisturbed.

We claim:

1. A spindle head of a machine, such as a diamond-tool boring machine, comprising: a body having portions of reduced bending strength arranged in lines parallel to the axis of the tool permitting the deformation of said body in at least two planes; bearings enclosed by said body; a spindle rotatable in said bearings; means for preliminary adjustment of the position of said spindle axis; and means for bending said body at said lines of reduced bending strength for fine adjustment of the position of said spindle axis in space.

2. A spindle head of a machine, such as a diamond-tool boring machine, comprising: a body which has thin portions to reduce bending strength, permitting the deformation of said body in at least two planes; bearings enclosed by said body; a spindle rotatable in said bearings; means for general adjustment of the position of said spindle axis in space; and means for fine adjustment of the position of said spindle axis by deformation of said body.

3. A spindle head of a machine, such as a diamond-tool boring machine, comprising: a body which has areas with at least one hole therein to reduce bending strength to permit the deformation of said body in at least two planes; bearings enclosed by said body; a spindle rotatable in said bearings; means for preliminary adjustment of the position of said spindle axis; and means for fine adjustment of the position of said spindle axis.

4. A spindle head as claimed in claim 1, in which the areas of reduced bending strength are formed by at least one groove.

5. A spindle head as claimed in claim 1, in which the means for fine adjustment of the position of said spindle axis in space are screws disposed in the body of said head.

6. A spindle head as claimed in claim 2, in which the means for fine adjustment of the position of said spindle axis are screws disposed in the body thereof.

7. A spindle head as claimed in claim 3, in which the means for fine adjustment of the position of said spindle axis are screws disposed in the body walls.

8. A spindle head as claimed in claim 4, in which the means for fine adjustment of the position of said spindle axis are screws disposed in the body walls, and stop means are provided on said screws to prevent overstressing of the said body.

References Cited

UNITED STATES PATENTS 3,221,606  12/1965  Baldwin _____ 90—11.1

FOREIGN PATENTS 941,583  4/1956  Germany.

GERALD A. DOST, *Primary Examiner.*

U.S. Cl. X.R.

90—11; 82—30